(12) United States Patent
Hershey et al.

(10) Patent No.: US 6,417,805 B1
(45) Date of Patent: Jul. 9, 2002

(54) THREE-DIMENSIONAL CHANNEL SOUNDER FOR DTV RECEIVERS

(75) Inventors: John Erik Hershey, Ballston Lake; Mark Lewis Grabb, Burnt Hills; Kenneth Brakeley Welles, II, Scotia, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/422,443

(22) Filed: Oct. 21, 1999

(51) Int. Cl.$^7$ .............................. G01S 3/02; G01S 15/74
(52) U.S. Cl. ..................... 342/453; 342/46; 342/465
(58) Field of Search ................................. 342/453, 465, 342/451, 59, 125, 126, 378, 463; 348/614; 315/8, 85; 345/158, 181

(56) References Cited

U.S. PATENT DOCUMENTS

| | | | |
|---|---|---|---|
| 5,119,196 A | * | 6/1992 | Ayanoglu et al. ............ 348/614 |
| 5,920,285 A | * | 7/1999 | Benjamin .................... 342/368 |
| 6,122,015 A | * | 9/2000 | Al Dhahir et al. ........... 348/614 |

OTHER PUBLICATIONS

Kurner, Thomas et al, "Comparison of Measured and Predicted Locations of Interfering Scatterers", IEEE Conf Pub Antennas and Propagation, Apr. 1995, pp. 363–366.*

Indoor and Outdoor UHF Measurements with a 90 MHz Bandwidth Dept. of Electrical Engineering and Electronics, UMIST, PO Box 88, Manchester M60 1QD.

Characterization of the HDTV Channel in the Denver Area GA Hufford, JR Goodwin, RJ Matheson, VS Lawrence and LE Pratt, US Dept. of Commerce, Dec. 1990 pp. iii–32.

* cited by examiner

*Primary Examiner*—Gregory C. Issing
(74) *Attorney, Agent, or Firm*—John F. Thompson; Donald S. Ingraham

(57) ABSTRACT

A digital television (DTV) receiver is provided with a sounder comprising a wideband transmitter and a plurality of wideband receivers having separately located receiving antennas, so that the sounder is, in effect, a bistatic radar system for any given channel, in order to characterize a significant nearby, indoor reflector. A microprocessor receives the timing information generated by the wideband transmitter impulses and the reflected impulse returns to each of the receiving antennas, and calculates a multipath model representing the three-dimensional location of a significant, nearby scatterer.

21 Claims, 2 Drawing Sheets

THREE-DIMENSIONAL CHANNEL SOUNDER FOR DTV RECEIVERS

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to digital television (DTV) receivers and, more particularly, to a transmitter and receiver arrangement for a DTV receiver used to characterize significant, nearby indoor multipath reflectors.

2. Background Art

Digital television (DTV) is an emerging technology that is capable of providing video, audio and data services. The digital format allows for a great deal of flexibility in the content carried by DTV transmission. For example, High Definition Television (HDTV) service can be enabled using DTV. In the United States, research on HDTV has focused on digital, rather than analog, technology. While digital HDTV (or, more simply DTV) is not currently available, Japanese companies have developed an HDTV system based on analog technology (known as Hivision) that has been in use since 1991. Because of the potential advantages of digital HDTV and many technical problems shared by both types of systems, research in digital HDTV has also been active in Japan. See, for example, David K. Kahaner in "HDTV Research in Japan", *IEEE Micro*, October 1993, pp. 49–53.

One of the most important prevalent problems in HDTV is the problem of multipath. In fact, it is useful to think of the HDTV channel as multipath limited and not power limited. Multipath may arise from fixed structures acting as reflectors in the transmission channel such as building walls. Moving objects, such as airplanes, may also cause a multipath condition. Even microreflections in cabling can cause multipath. See, for example, P. T. Marhiopoulos and M. Sablatash, "Design of a Ghost Canceling Reference Signal for Television Systems in North America", *Proceedings of Canadian Conference on Electrical and Computer Engineering*, Vancouver, BC, Canada, Sep. 14–17, 1993, pp. 660–663.

The effect of multipath is to create "ghosts" in the displayed TV image. The statistics of multipath ghosts have been studied and compiled by, among others, the BTA (Japan's Broadcasting Technology Association). A BTA survey reported that 92% of ghosts are within a −4 to 26 microsecond ($\mu$sec) range, and when extended to −4 to 37 $\mu$sec, almost all cases are covered.

An adaptive equalizer has been proposed to "undo" the effects of the multipath. In its crudest form, an adaptive equalizer can be thought of as a signal processor that estimates the parameters of a hypothetical filter that best describes the channel. The signal processor adjusts the taps of the adaptive equalization filter to approximate an inverse of the hypothetical filter, thus inverting, or undoing, the effects of the multipath.

The BTA, and other concerns, designed a "ghost canceling reference (GCR)" transmitted signal to mitigate these multipath induced effects. The BTA GCR was found to be less than satisfactory in some cases. While homes with outdoor antennas displayed non-varying (stationary) ghosting conditions which could be largely corrected, those homes with indoor antennas experienced changing (dynamic) ghosts. These ghosting conditions were more prevalent where people were moving about the room or moving bodies were in the signal path. The BTA ghost canceller generally was not able to adequately compensate for these conditions. In fact, false ghosts were actually added to an already ghosted picture leading to reduced picture quality.

Thus, multipath behavior of the HDTV channel is important for two different regimes, the outdoor antenna propagation channel and the indoor antenna propagation channel. The former is well studied and understood. The latter situation still presents a problem. The chief difference is the presence of significant reflectors near the indoor receiving antenna, which implies that there will be multipath whose delay occasions it to fall within a symbol period. In order to resolve multipath differences of such limited extent, special techniques must be employed or the channel diagnostic signal must have a very wide effective bandwidth. According to S. Salous in "Indoor and Outdoor UHF Measurements with a 90 MHZ Bandwidth", *IEEE Colloquium on Propagation Characteristics and Related System Techniques for Beyond Line-of-Sight Radio*, 1997, pp. 8/1–8/6, the extent of multipath delays in outdoor environments can be a few tens of $\mu$secs, whereas in indoor environments, multipath delays are on the order of a few hundred nanoseconds. While multipath components can be adequately resolved with a 10 to 40 MHZ bandwidth for outdoor environments, the resolution of multipath for indoor environments requires 90 to 100 MHZ bandwidth.

SUMMARY OF THE INVENTION

A significant, nearby indoor multipath reflector is characterized by providing a DTV receiver with a sounder comprised of a special transmitter and a plurality of separately located receivers, each receiver including a respective transducer or antenna, so that the sounder, in effect, comprises a bistatic radar system for any given channel. A microprocessor receives the timing information generated by the transmitter impulses and the reflected returns to each of the receiving transducers or antennas, and calculates a multipath model representing the three-dimensional location of a nearby scatterer.

The location of the nearby scatterer enables, as an ancillary feature, adaptive nulling of a reflected or scattered (multipath) signal from a significant nearby scatterer. Depending upon the characteristics of the scatterer, this multipath signal may create flat (frequency) fading of the DTV signal received by the antenna of the DTV receiver. If the DTV receiver is equipped with a multi-element receiver aperture, wherein each element is individually controllable as to gain, knowledge of the relative position of the significant scatterer to the DTV receiver antenna allows a null in the antenna aperture to be steered in the direction of the nearby significant scatterer, thus mitigating the multipath signal and mitigating the flat fading condition. The result is a higher signal-to-noise ratio at the front-end of the DTV receiver with a concomitant increase in picture quality.

DETAILED DESCRIPTION OF THE INVENTION

Figure 1:
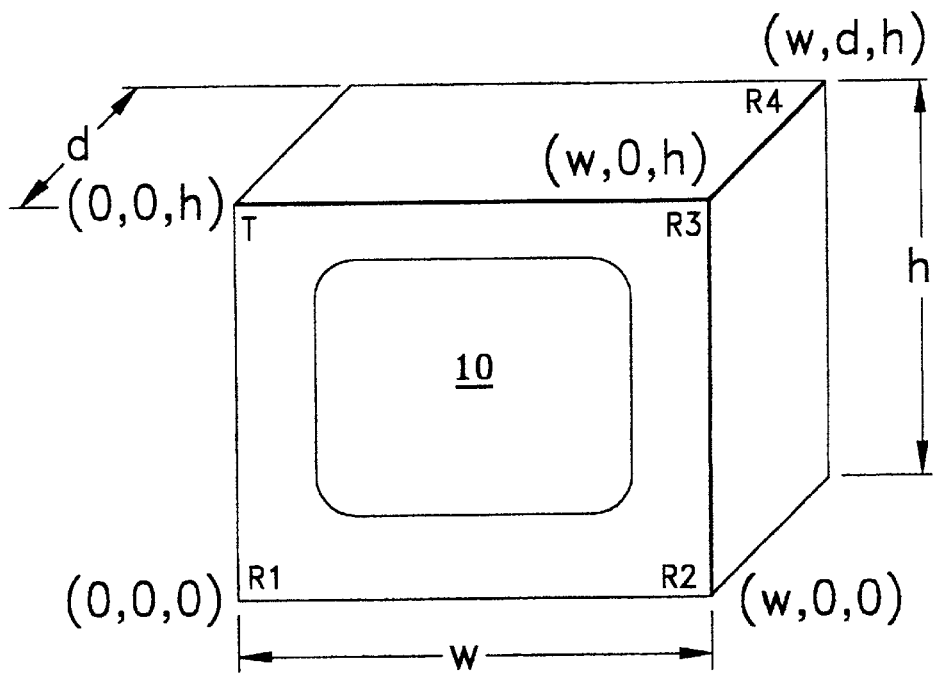
FIG. 1 is an isometric view of a cabinet containing a digital television (DTV) receiver and including a transmitter and a plurality of receiving antennas used to characterize the indoor reflectors according to a preferred embodiment of the invention.

FIG. 1 illustrates a cabinet containing a digital television (DTV) receiver 10, along with special bistatic radar according to a preferred embodiment of the invention. The DTV receiver is provided with a special wideband (e.g., up to 1–2 $GH_z$ bandwidth or higher) transmitter and a plurality of receiving antennas coupled to wideband receivers for receiving signals from the wideband transmitter, in effect a bistatic radar system, in order to characterize the significant, indoor multipath reflector. The problem of estimating the location of a nearby significant scatterer using the time of reception of the transmitted train of impulses is equivalent to the inverted Global Positioning System (GPS) location estimation problem. The analog is to consider fixed sites for the wideband receivers, of which there are four associated with the DTV receiver, as analogous to the four satellites needed to make a position fix, and to consider the scatterer as analogous to the location of the entity using the GPS.

The coordinates of the wideband transmitter and wideband receiver antennas are given in terms of a Cartesian coordinate system relative to the DTV receiver and centered on the left front bottom of the DTV receiver cabinet. Thus, a bistatic wideband transmitter T located at the left front top of the DTV receiver cabinet has coordinates (0,0,h), where h is the height of the cabinet. There are four wideband receivers, R1, R2, R3, and R4. Receiver R1 is located at coordinates (0,0,0), receiver R2 is located at coordinates (w,0,0), where w is the width of the cabinet, receiver R3 is located at coordinates (w,0,h), and receiver R4 is located at coordinates (w,d,h), where d is the depth of the cabinet.

The multipath characterization procedure is as follows. The wideband transmitter T periodically emits a very low power train of impulses. Such devices are available commercially; e.g., from the Time Domain Corporation of Huntsville, Alabama. The wideband receivers R1 to R4 note the time when the train of impulses is received and the strength of the return. This information is sent to a microprocessor (not shown in FIG. 1). Using a known appropriate algorithm, such as the Hotelling algorithm, the microprocessor estimates the location and electromagnetic cross-section of the nearby scatterer. A version of the Hotelling algorithm that can be applied is found in "A Navigation Algorithm for the Low-Cost GPS Receiver", by P. Noe, K. Myers and T. Wu in Global Positioning System Papers published in *Navigation*, Vol. I (1980) pp. 166–172, by the Institute of Navigation, and incorporated herein by reference. The microprocessor calculates the multipath model where such model is the estimated location, (x, y, z), of an existing and significant nearby electromagnetic scatterer referenced to the Cartesian coordinate system centered on the left front bottom of the DTV set.

Figure 2:
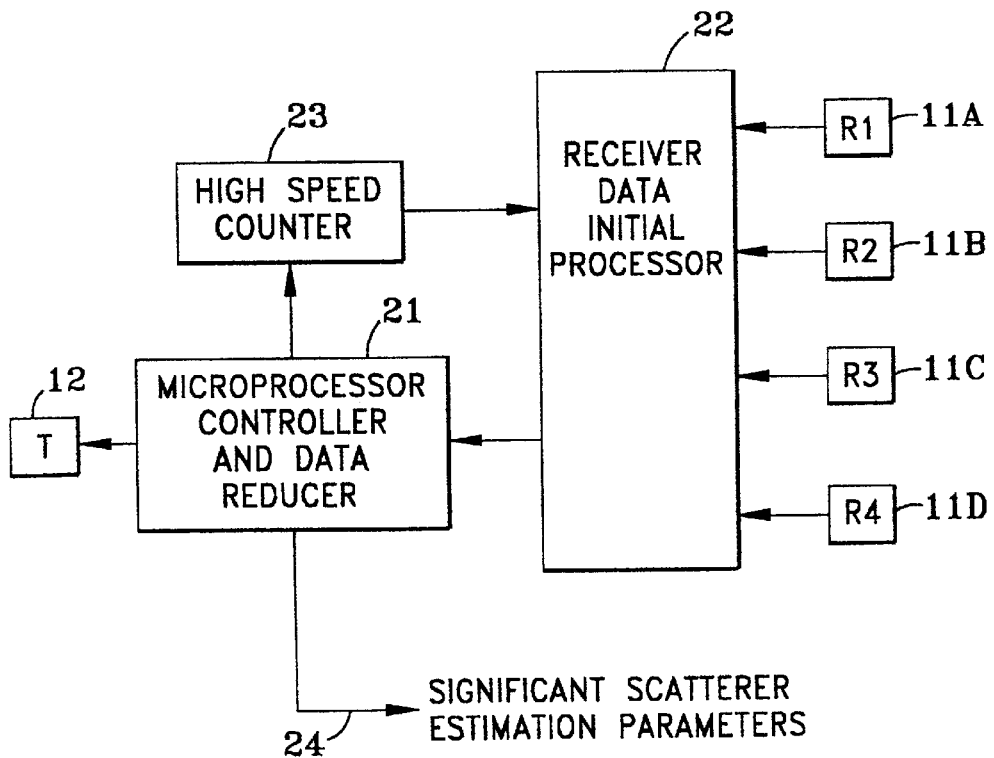
FIG. 2 is a block diagram of multipath characterization circuitry which controls what the transmitter receives as its input signals from the receiving antennas.

FIG. 2 shows a block diagram of multipath characterization circuitry wherein the wideband transmitter 12, under control of a microprocessor controller and data reducer 21, transmits a very low power train of impulses. A high speed counter 23 is reset at the beginning of transmission and provides an output indication to a receiver data initial processor 22, which also receives signals from the four wideband receivers 11A, 11B, 11C, and 11D. An output port 24 from microprocessor controller and data reducer 21 supplies significant scatterer estimation parameters; i.e., device 21 characterizes the nearby significant scatterer.

Figure 3:
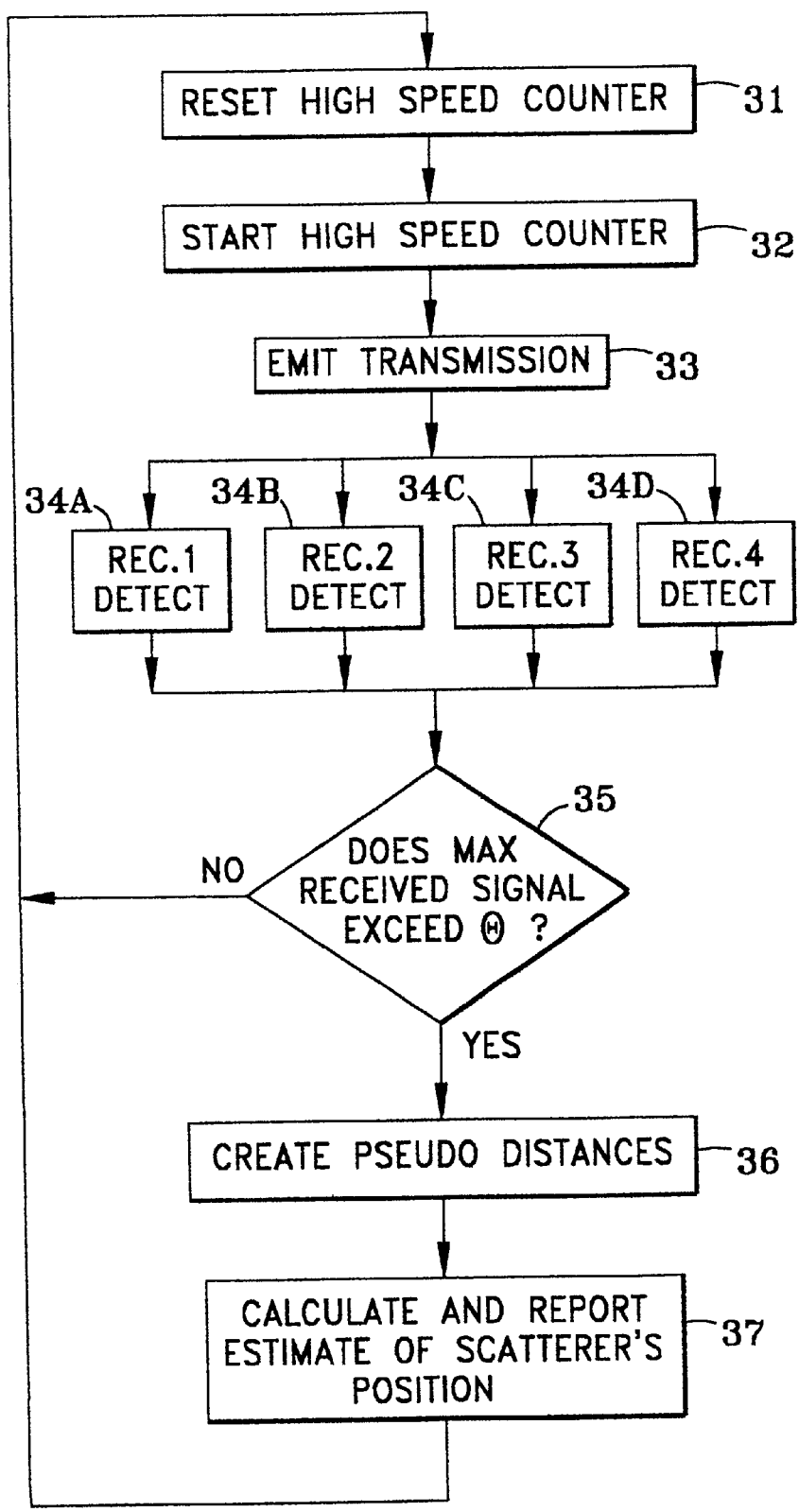
FIG. 3 is a flow diagram showing the logic of the computing and control program of the microprocessor in the circuit of FIG. 2.

FIG. 3 represents the flow diagram for the logic implemented by the microprocessor controller and data reducer 21 shown in FIG. 2. Periodically, and based on the known dynamics of indoor multipath (a preferred definition of period is 100 milliseconds), microprocessor controller and data reducer 21 resets high speed counter 23 at step 31 and starts the counter counting from zero at step 32. The output signal of high speed counter 23 is supplied to receiver data initial processor 22. Microprocessor controller and data reducer 21 then causes transmitter 12 to emit a transmission, at step 33, consisting of a very low power train of impulses. On their individual detections of the multipath scattered wideband transmission, wideband receivers 11A, 11B, 11C, and 11D report to receiver data initial processor 22 (1) detection epoch and (2) received strength of detected signal, as indicated at steps 34A, 34B, 34C, and 34D. Receiver data initial processor 22 converts the individual detection epochs into the count of high speed counter 23 corresponding to the epoch or time of transmission receipts. These counts and signal strengths are reported to microprocessor controller and data reducer 21 which determine, at step 35, if the maximum of the four reported received signal strengths exceeds a preset threshold θ for significant multipath. If so, the microprocessor controller and data reducer converts the counts of high speed counter 23 into a set of pseudo-distances, at step 36, to be used by the Hotelling algorithm to estimate the location of the nearby multipath scatterer. The pseudo-distances are created by first identifying the lowest value count and subtracting it from the other three counts, to create three pseudo-counts. The three pseudo-distances are calculated at step 36 by multiplying the three pseudo-counts by the free space distances traveled by light in the time represented by the three pseudo-counts. The scatterer location is then reported by the microprocessor controller and data reducer at its output port 24, as indicated at step 37, before the process loops back to step 31 where the microprocessor controller and data reducer resets the high speed counter, restarting the process. If the maximum of the four reported received signal strengths does not exceed a preset threshold θ for significant multipath, then microprocessor controller and data reducer 21 resets counter 23 at step 31 without creating the pseudo-counts and calculating an estimated position of the scatterer.

This technique is especially geometrically efficacious in the UHF region as it is possible to achieve bistatic wideband receiver separations on the order of a half wavelength. It is possible to access the Geometric Dilution of Precision (GDOP) for what is essentially a time difference of arrival direction finding scheme for a nearby scatterer at location (x,y,z) by calculating $$GDOP = \sqrt{\text{Trace}(H^T H - 1)},$$

$$H = \begin{pmatrix} u_{x1} u_{y1} u_{z1} 1 \\ u_{x2} u_{y2} u_{z2} 1 \\ u_{x3} u_{y3} u_{z3} 1 \\ u_{x4} u_{y4} u_{z4} 1 \end{pmatrix},$$

where where $u_i = (u_{xi}, u_{yi}, u_{zi})$ is the unit vector pointing from the scatterer to bistatic wideband receiver antenna i.

Depending upon the characteristics of the signal scatterer, the multipath signal may create flat (frequency) fading of the DTV signal received by the antenna of the DTV receiver. By equipping the DTV receiver with a multi-element receiver aperture, wherein each element is individually controllable as to gain, knowledge of the relative position of the significant scatterer to the DTV receiver antenna allows a null in the antenna aperture to be steered in the direction of the nearby significant scatterer, thus mitigating the multipath signal and mitigating the flat fading condition. The result is a higher signal-to-noise ratio at the front-end of the DTV receiver with a concomitant increase in picture quality.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is:

1. A sounder for a digital television receiver comprising:
   a wideband transmitter for emitting impulses;
   a plurality of wideband receivers for receiving said impulses;
   said wideband transmitter and wideband receivers being located at known coordinates relative to the television receiver;
   said wideband receivers being operational to receive reflections of the wideband transmitter impulses from a nearby reflector; and
   processing means for receiving timing information generated by said wideband transmitter impulses and the reflections received at each of the wideband receivers and for calculating a location of the nearby reflector and a multipath model based on the received reflections.

2. The sounder recited in claim 1, wherein said plurality of wideband receivers comprises four receivers and the processing means is adapted to calculate location of the nearby reflector as an inverted Global Positioning System (GPS) location estimation problem.

3. The sounder recited in claim 2, further comprising a counter controlled by the processing means to begin counting with a train of impulses transmitted by the wideband transmitter, the processing means being adapted to convert counts from said counter into a set of pseudo-distances corresponding to receipt of a signal reflected from said nearby reflector.

4. The sounder recited in claim 1, wherein the nearby reflector comprises a moving body.

5. The sounder recited in claim 3 wherein the processing means comprises a receiver data initial processor and a microprocessor controller and data reducer responsive thereto.

6. The sounder recited in claim 1 wherein said wideband transmitter is adapted to transmit a signal of 1–2 GHz in bandwidth.

7. A three-dimensional channel sounder for a digital television (DTV) receiver comprising:
   a wideband transmitter for emitting impulses;
   a plurality of wideband receivers having respective receiving antennas located at known coordinates relative to the DTV receiver and being operational to form a bistatic radar system in order to characterize a nearby, indoor signal scatterer;
   a receiver data initial processor; and
   a microprocessor responsive to -said receiver data initial processor, said processor and microprocessor being adapted to receive timing information generated by said wideband transmitter impulses and the reflected impulse returns at each of the receiving antennas and to calculate a location of the nearby scatterer and to further calculate a multipath model.

8. The three-dimensional channel sounder recited in claim 7, wherein said plurality of receiving antennas is four and the microprocessor is adapted to calculate location of the nearby scatterer as an inverted Global Positioning System (GPS) location estimation problem.

9. The three-dimensional channel sounder recited in claim 8, further comprising a high speed counter controlled by the microprocessor to begin counting with a train of impulses transmitted by the wideband transmitter, the microprocessor being adapted to convert counts of the counter into a set of pseudo-distances corresponding to receipt of a signal reflected from said nearby scatterer.

10. The three-dimensional channel so under recited in claim 7, wherein the nearby, indoor reflector comprises a moving body.

11. The three-dimensional channel sounder recited in claim 7 wherein said wideband transmitter is adapted to emit pulses of 1–2 GHz bandwidth.

12. A method of creating a model of an indoor reflector that generates multipath to a digital television receiver, comprising the steps of:
   transmitting from a known location a plurality of impulses;
   receiving at a plurality of known locations reflections of the transmitted impulses; and
   calculating location of the indoor reflector based on timing of the received reflections.

13. The method recited in claim 12, wherein the step of calculating location of the indoor reflector comprises calculating a multipath model of the reflector.

14. The method recited in claim 12, wherein the step of receiving is performed at four locations and the step of calculating the location of the indoor reflector is performed as an inverted Global Positioning System (GPS) location estimation problem.

15. The method recited in claim 14, further comprising the steps of:
   counting in synchronism with a train of said transmitted impulses; and
   converting the counts into a set of pseudo-distances corresponding to receipt of a signal reflected from said indoor reflector.

16. The method recited in claim 12, wherein the indoor reflector comprises a moving body.

17. A method of creating a model of a significant, nearby indoor reflector that generates multipath to a digital television (DTV) receiver, comprising the steps of:
   transmitting a plurality of impulses from a known location relative to the DTV receiver;
   receiving at a plurality of known locations relative to the DTV receiver reflections of the transmitted impulses; and
   calculating location of the significant nearby indoor reflector based on timing of the received reflections.

18. The method recited in claim 17, wherein the step of calculating location of the significant nearby indoor reflector comprises calculating a multipath model of the significant, nearby indoor reflector.

19. The method recited in claim 17, wherein the step of receiving is performed at four locations and the step of calculating location of the significant nearby indoor reflector is performed as an inverted Global Positioning System (GPS) location estimation problem.

20. The method recited in claim 19, further comprising the steps of:

counting in synchronism with a train of said transmitted impulses; and converting the counts into a set of pseudo-distances corresponding to receipt of a signal reflected from said significant nearby indoor reflector.

21. The method recited in claim 17, wherein the significant nearby indoor reflector comprises a moving body.

* * * * *